(12) United States Patent
Finkowski et al.

(10) Patent No.: US 8,407,973 B2
(45) Date of Patent: Apr. 2, 2013

(54) FOOD PACKAGING WITH VERTICAL TO HORIZONTAL TRANSFER LOADING

(75) Inventors: James W. Finkowski, Andover, MN (US); Craig E. Gustafson, Bloomington, MN (US); Mark E. Arlinghaus, Minneapolis, MN (US); Ralph Stenvik, Coon Rapids, MN (US); Dennis B. Usgaard, Crystal, MN (US)

(73) Assignee: General Mills, Inc., Minneapolis, MN (US)

( * ) Notice: Subject to any disclaimer, the term of this patent is extended or adjusted under 35 U.S.C. 154(b) by 336 days.

(21) Appl. No.: 12/845,033

(22) Filed: Jul. 28, 2010

(65) Prior Publication Data

US 2011/0023417 A1  Feb. 3, 2011

Related U.S. Application Data

(60) Provisional application No. 61/229,322, filed on Jul. 29, 2009.

(51) Int. Cl.
*B65B 35/50* (2006.01)
*B65B 35/56* (2006.01)
*B65B 23/16* (2006.01)
*B65B 23/14* (2006.01)
*B65B 9/04* (2006.01)

(52) U.S. Cl. ............... 53/540; 53/532; 53/544; 53/559; 53/247; 53/254

(58) Field of Classification Search .............. 53/152, 53/153, 531, 532, 540, 544, 559, 247, 249, 53/250, 251, 254, 255, 260; *B65B 35/50, B65B 35/56, 23/12, 23/14, 23/16*
See application file for complete search history.

(56) References Cited

U.S. PATENT DOCUMENTS

| | | | | |
|---|---|---|---|---|
| 1,085,673 | A * | 2/1914 | Doldt ........................... | 53/254 |
| 1,454,261 | A * | 5/1923 | Barbieri ....................... | 53/531 |
| 2,656,656 | A * | 10/1953 | Murdoeh et al. ............ | 53/544 |
| 2,829,478 | A * | 4/1958 | Engleson et al. ............ | 53/251 |
| 3,154,986 | A * | 11/1964 | Reid ............................ | 53/247 |
| 3,273,300 | A | 9/1966 | Watrous et al. | |
| 3,279,927 | A | 10/1966 | Reid | |
| 3,458,970 | A * | 8/1969 | Reid et al. .................... | 53/251 |
| 3,583,586 | A | 6/1971 | Burton | |
| 3,766,706 | A * | 10/1973 | Graham ........................ | 53/260 |
| 3,786,617 | A * | 1/1974 | Fluck ............................ | 53/531 |
| 3,927,508 | A * | 12/1975 | Campbell, III ............... | 53/251 |
| 4,162,870 | A * | 7/1979 | Storm ........................... | 53/247 |
| 4,203,274 | A * | 5/1980 | Warkentin et al. ............ | 53/251 |
| 4,364,467 | A * | 12/1982 | Blakelock ................... | 198/429 |

(Continued)

FOREIGN PATENT DOCUMENTS

| | | | |
|---|---|---|---|
| DE | 3943395 A1 | * | 7/1991 |
| DE | 10129226 A1 | * | 1/2003 |

(Continued)

*Primary Examiner* — Stephen F Gerrity
(74) *Attorney, Agent, or Firm* — Everett Diederiks; John L. Crimmins

(57) ABSTRACT

A method and system for packaging products provides for initially, vertically stacking a plurality of products during production in a transfer canister, simultaneously removing a stack of the products from the transfer canister, reorienting the stack and horizontally loading the stack into a final product package cavity. The invention has applicability to a wide range of products, particularly food products, such as refrigerated dough products. In one embodiment of the invention, the product package cavity is thermoformed as part as an overall horizontal form, fill and seal system.

11 Claims, 11 Drawing Sheets

U.S. PATENT DOCUMENTS

| | | | |
|---|---|---|---|
| 4,627,215 A * | 12/1986 | Walz | 53/534 |
| 5,247,782 A | 9/1993 | Rejsa | |
| 5,277,533 A * | 1/1994 | Caridis et al. | 414/21 |
| 5,410,859 A | 5/1995 | Kresak et al. | |
| 6,427,096 B1 | 7/2002 | Lewis et al. | |
| 6,438,925 B1 * | 8/2002 | Straub | 53/531 |
| 6,520,726 B1 | 2/2003 | Cook et al. | |
| 6,578,344 B1 * | 6/2003 | Fluck | 53/254 |
| 6,635,291 B2 | 10/2003 | Perry et al. | |
| 6,662,534 B2 * | 12/2003 | Straub et al. | 53/255 |
| 6,733,803 B1 | 5/2004 | Vidkjaer | |
| D560,490 S | 1/2008 | Kirk et al. | |
| D579,768 S | 11/2008 | Kirk et al. | |
| 7,462,012 B2 | 12/2008 | Hart et al. | |
| 7,591,124 B2 * | 9/2009 | Ruz et al. | 53/535 |
| 2001/0002270 A1 | 5/2001 | Perry et al. | |
| 2003/0044267 A1 * | 3/2003 | Pfeiffer et al. | 414/788.1 |
| 2003/0082274 A1 | 5/2003 | Bauer et al. | |
| 2004/0020167 A1 * | 2/2004 | Bertuzzi et al. | 53/544 |
| 2005/0281923 A1 | 12/2005 | Kubat et al. | |
| 2006/0263494 A1 | 11/2006 | Geng et al. | |
| 2008/0193612 A1 | 8/2008 | Domingues et al. | |
| 2008/0286420 A1 | 11/2008 | Domingues et al. | |
| 2009/0181135 A1 | 7/2009 | Domingues et al. | |
| 2011/0027438 A1 * | 2/2011 | Finkowski et al. | 426/413 |

FOREIGN PATENT DOCUMENTS

| | | |
|---|---|---|
| EP | 644119 A1 * | 3/1995 |

* cited by examiner

FOOD PACKAGING WITH VERTICAL TO HORIZONTAL TRANSFER LOADING

CROSS REFERENCE TO RELATED APPLICATIONS

The present invention claims the benefit of U.S. Provisional Patent Application Ser. No. 61/229,322 entitled "Food Packaging with Vertical to Horizontal Transfer Loading" filed Jul. 29, 2009.

FIELD OF THE INVENTION

The invention pertains to the art of packaging and, more specifically, to packaging of various products, particularly dough products, wherein the products are vertically loaded in canisters during production and subsequently transferred from the canisters for horizontal loading in final packaging.

BACKGROUND OF THE INVENTION

It is common to stack and package various products in a vertical configuration. For instance, it is known to package a refrigerated dough product in a canister of a fixed volume formed from composite paperboard which is spirally wound into a cylinder, with the refrigerated dough product being further proofed in the canister. In one known system, a shaped packer is used to cut hexagonal shaped dough pieces, such as biscuits, from a sheet of dough and direct the dough pieces into respective canisters traveling below the packer. This overall process can be used to effectively stack multiple dough pieces, such as 4-10 biscuits, in a single, substantially continuously indexed container at a high rate. However, packaging products in cardboard is actually, relatively expensive and, at least in connection with products having a small profit margin, can be cost prohibitive.

Mainly because of cost efficiencies and packaging versatility, vertical and horizontal form, fill and seal packaging systems have become increasingly popular, particularly in the food industry. For instance, vertical form, fill and seal systems have been used in connection with making sealed bags, such as potato chip and other types of snack bags, while horizontal form, fill and seal (HFFS) packaging systems have been known for use in effectively packaging other food products. By way of an example, a HFFS system can be employed to create product cavities or pouches in a lower film, with the pouches being filled with frozen dough products and sealed with an upper film. In any case, at least in certain circumstances, there can be stacking and other advantages associated with horizontally loaded packages.

Certainly, it is possible to make numerous products which can be directly packaged in a horizontal fashion. However, it is an aspect of the invention to form horizontally loaded packaging while retaining the efficiency of vertical product stacking during production. For instance, it is considered to be advantageous to enable various food products which are known to be vertically stacked and packaged, to actually be vertically stacked and packaged horizontally, such as in pouches made by an HFFS system.

SUMMARY OF THE INVENTION

The invention is directed to a method and system for packaging products wherein the products are initially, vertically stacked during production and then transferred for horizontal loading, as a stack. Although the invention has applicability to a wide range of products, it is considered to be particularly advantageous in connection with packaging food products, such as refrigerated dough products. More specifically, in accordance with the invention, multiple products are produced and stacked in a transfer canister. The stack of products are then removed from the canister and transferred to a final package in which the stack of products is horizontally loaded. In one embodiment of the invention, the canister incorporates a shutter door mechanism wherein an actuator can be engaged, such as by a robotic pick-up device, to automatically open one or more doors of the canister to expose the stack. The stack can then be removed from the canister, re-orientated and transferred for horizontal loading. In another embodiment, an auxiliary device can be used in combination with a pick-up device wherein the auxiliary device functions to open the canister to expose the stack such that the pick-up device can readily access and remove the stack for final packaging.

Additional objects, features and advantages of the invention will become more readily apparent from the following detailed description when taken in conjunction with the drawings wherein like reference numerals refer to corresponding parts in the several views.

DETAILED DESCRIPTION OF EMBODIMENTS

Figure 1:
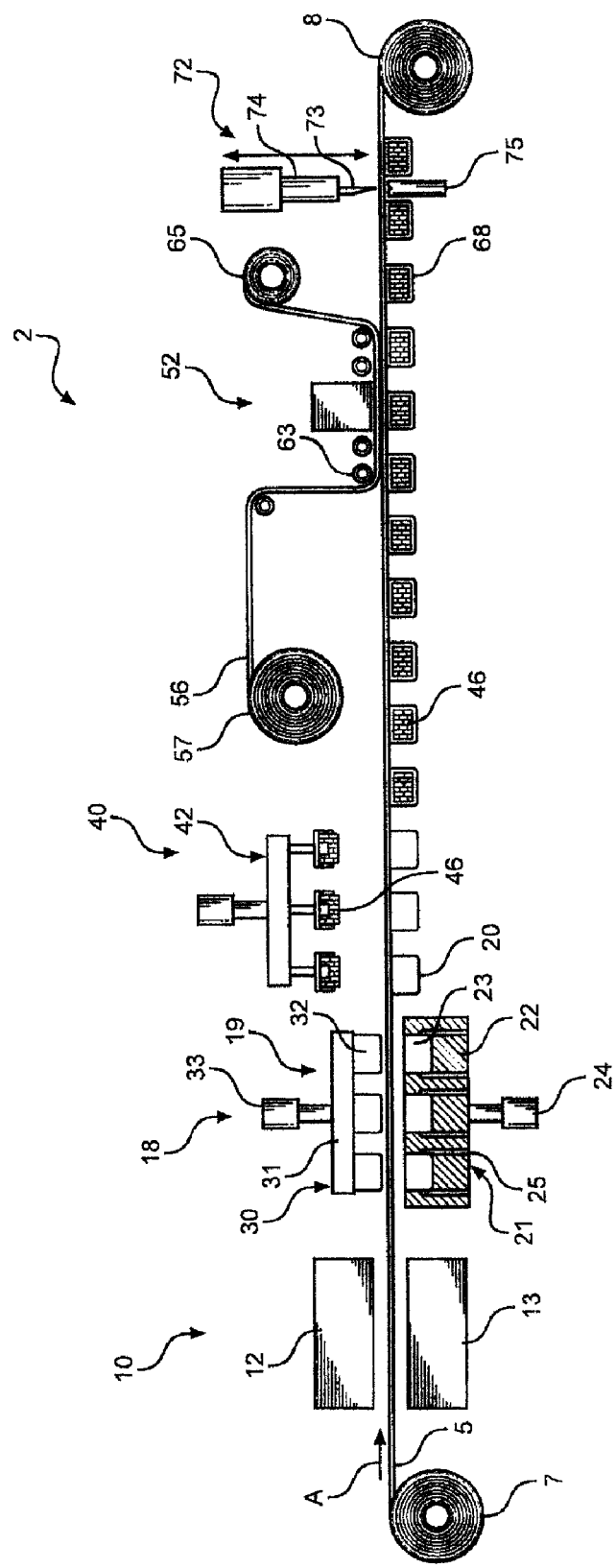
FIG. 1 schematically illustrates a horizontal form, fill and seal (HFFS) system which can be employed in an embodiment of the invention.

As will become more fully evident below, the invention can be performed with various types of packaging systems and containers. However, in accordance with an advantageous embodiment exemplified in FIG. 1, a horizontal form, fill and seal (HFFS) system 2 is employed. As shown, system 2 has associated therewith a first or lower film 5 which runs from a payout reel 7 in the direction of arrow A to a take-up reel 8. As will become more fully evident below, the majority of film 5 is used in connection with packaging products and take-up reel 8 receives the left over or scrap film. In one form, take-up reel 8 merely receives lateral edge portions of lower film 5, such as an inch (approximately 2.54 cm) of either side of film 5, while the remainder of the film 5 is employed in the final package. In any case, lower film 5 is first directed to a heating station 10 and is directed between upper and lower heating units 12 and 13. In general, heating station 10 can employ various types of heater units 12, 13 known in the art, such as radiant and/or convection heaters. Basically, it is simply desired to heat lower film 5 for delivery to forming station 18. In forming station 18, a thermoforming unit 19 is employed to produce product cavities 20 in lower film 5. To this end, thermoforming unit 19 includes a lower cavity mold 21 having a main body 22 formed with recessed cavities 23. A linear actuator 24 is connected to main body 22 and designed to vertically shift main body 22 during the forming of product cavities 20. For use in connection with the forming process, fluid communication lines, such as that indicated at 25, extend through main body 22 to recessed cavities 23. In conjunction with lower cavity mold 21, thermoforming unit 19 includes an upper cavity mold 30 which also includes a main body 31 from which extend various projection molds 32 that conform to recessed cavities 23. In a manner similar to lower cavity mold 21, upper cavity mold 30 is connected to a linear actuator 33 used to vertically shift upper cavity mold 30 during a thermoforming operation.

In general, thermoforming devices such as that employed in connection with forming station 18 are widely known in the art and do not form part of the invention. However, for the sake of completeness, it should at least be understood that the function of forming station 18 is to receive heated lower film 5 between lower cavity mold 21 and upper cavity mold 30 at which time the movement of lower film 5 is temporarily stopped, projection molds 32 are mated with recessed cavities 23 in order to reshape lower film 5 to include product cavities 20. To aid in this shaping operation, fluid communication lines 25 can be hooked to a vacuum source in order to draw lower film 5 against recessed cavities 23, as well as to subsequently apply a positive pressure to aid in removing the formed product cavities 20 from lower cavity mold 21 after the thermoforming process is complete.

Once product cavities 20 are formed in lower film 5, lower film 5 advances to a loading or filling station generally indicated at 40. At this point, it should be recognized that filling station 40 can take various forms without departing from the invention. As illustrated, filling station 40 includes a loading unit 42 used to transport products, particularly a stack of products 46, into the individual product cavities 20. As the invention is particularly directed to the manner in which products 46 are initially stacked in a vertical manner and then reoriented and transferred for horizontal loading, such as by loading unit 42 into product cavities 20, further details of filling station 40 will be provided below after a further discussion of downstream packaging structure of exemplary HFFS packaging system 2.

After products 46 are loaded into product cavities 20, lower film 5 is advanced to a sealing station 52. As is widely known in connection with standard HFFS systems, a second or upper film 56 is drawn from a payout reel 57. After following various guide rollers 63 to sealing station 52, the remainder of upper film 56 is directed to a take-up reel 65. At sealing station 52, upper film 56 is sealed to lower film 5 across product cavities 20 in order to create an overall product package indicated at 68. Thereafter, package 68 is directed to a cutter station 72 wherein a blade element 73 is shifted vertically through the use of a linear actuator 74 against an anvil member 75 in order to cut each package 68 from the overall web defined by the mated lower film 5 and upper film 56.

Figure 2:
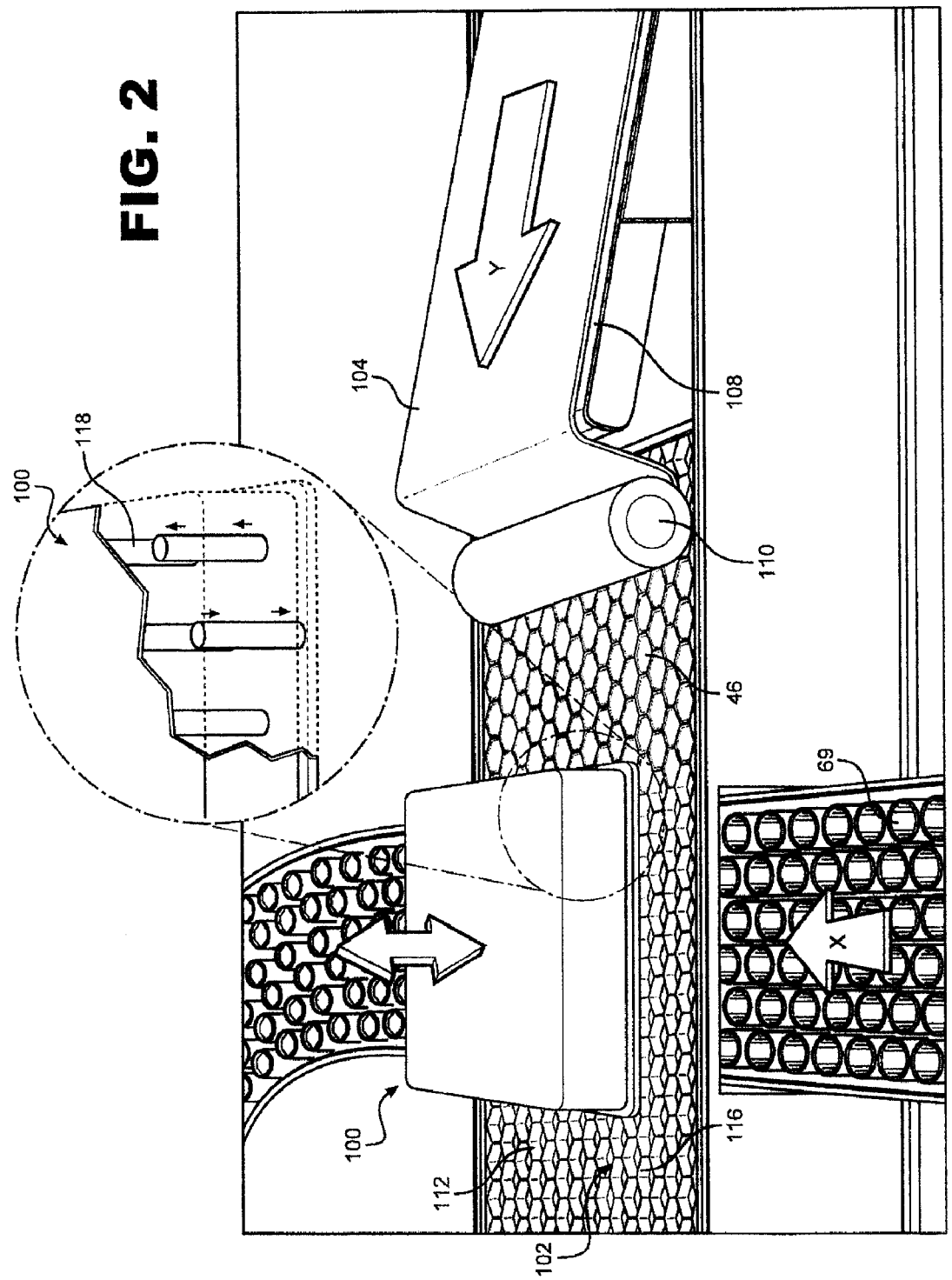
FIG. 2 is perspective view of a portion of a product forming and initial storing system employed in connection with the invention.

As indicated above, the invention is particular concerned with the manner in which products 46 are initially, vertically stacked in canisters, subsequently removed from the canisters as a stack, reoriented and transferred for horizontal loading into product cavities 20. By way of example, further details of the invention will be made to the formation, stacking, transferring and subsequent packaging of refrigerated dough products 46. However, it should be understood that the overall invention could be utilized in packaging a wide range of products. In any case, with reference to FIG. 2 for this exemplary embodiment, a hexagonal or other product shaped packer 100 is employed for directly vertically stacking refrigerated dough products 46. As shown, a series of adjacent transfer canisters 69 are conveyed in a first direction X and under a transport cutter plate 102. A sheet 104 of dough is directed along a conveyor 108, beneath a roller 110 and upon transport cutter plate 102 that moves in a second direction Y which is angled, more specifically perpendicular in the embodiment shown, relative to the first direction X. Transport cutter plate 102 is shown to take a generally honeycomb form, defining various openings 112 established by interconnected dough cutting edges 116 arranged in a hexagonal shape. This shape is desirable as it virtually eliminates any residual dough, except perhaps at the lateral edges of dough sheet 104. However, other shapes, such as circular or various polygon-shaped openings, could be employed. In any case, roller 110 forces the dough sheet 104 into openings 112 to create the various products 46 prior to packer 100 as clearly shown in this figure. Upon reaching packer 100 (shown as a stamping unit), vertical shifting of packer 100 causes loading arms 118, which are aligned with respective openings 112, to push or stamp products 46 directly vertically into respective ones of the transfer canisters 69. Thereafter, the products 46 will be re-directed to travel in the first direction X.

As also mentioned above, canisters 69 are only designed to temporarily stored products 46 in a stacked configuration. To this end, the stacked products 46 in each canister 69 are to be simultaneously removed, reoriented and transferred for horizontal loading in a respective product cavity 20. In performing this function, each canister 69 is designed to assume either a closed configuration wherein only an upper portion of the canister is open for receiving products 46 for vertically stacking and an open configuration for enabling the formed stack to be removed. With this in mind, it should be noted that the exact construction of transfer canister 69 can vary in accordance with the invention while still functioning as desired. However, for the sake of completeness, reference will be made to certain exemplary canister constructions employed to date.

Figure 3:
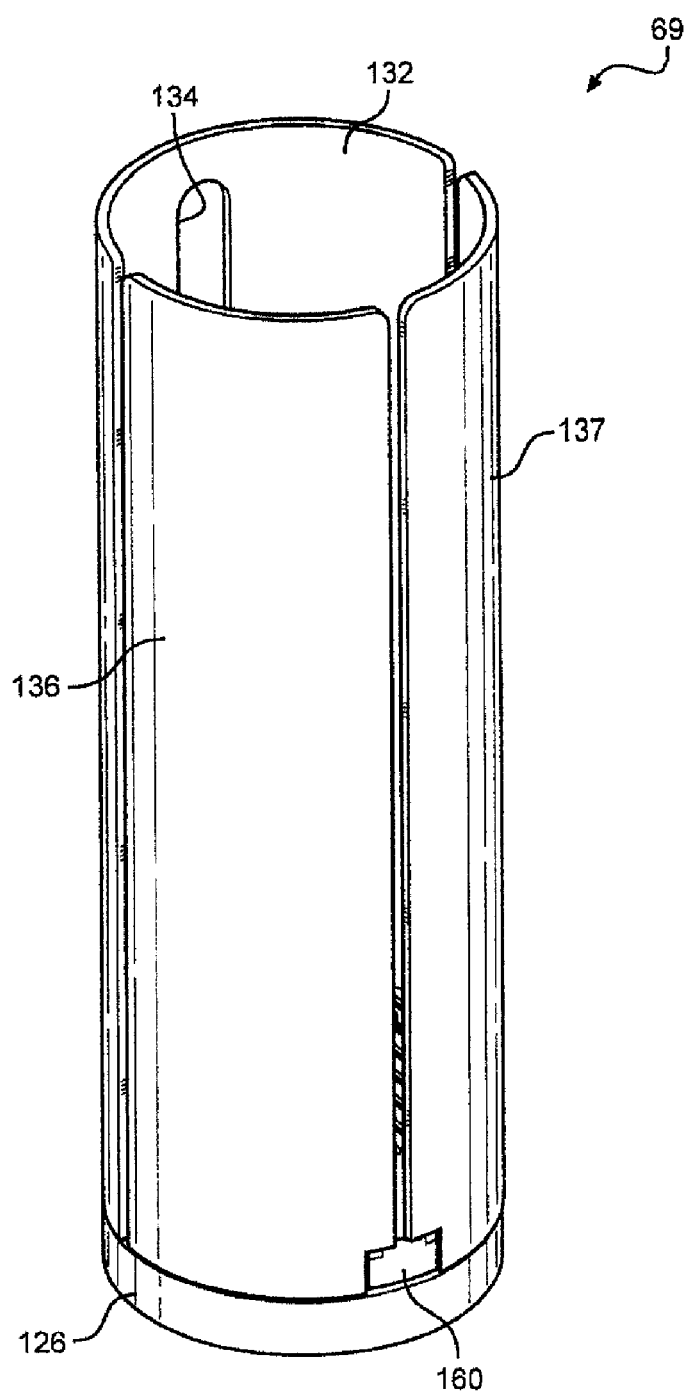
FIG. 3 is a perspective view of a transfer canister constructed in accordance with a first embodiment of the invention in a closed condition.
Figure 4:
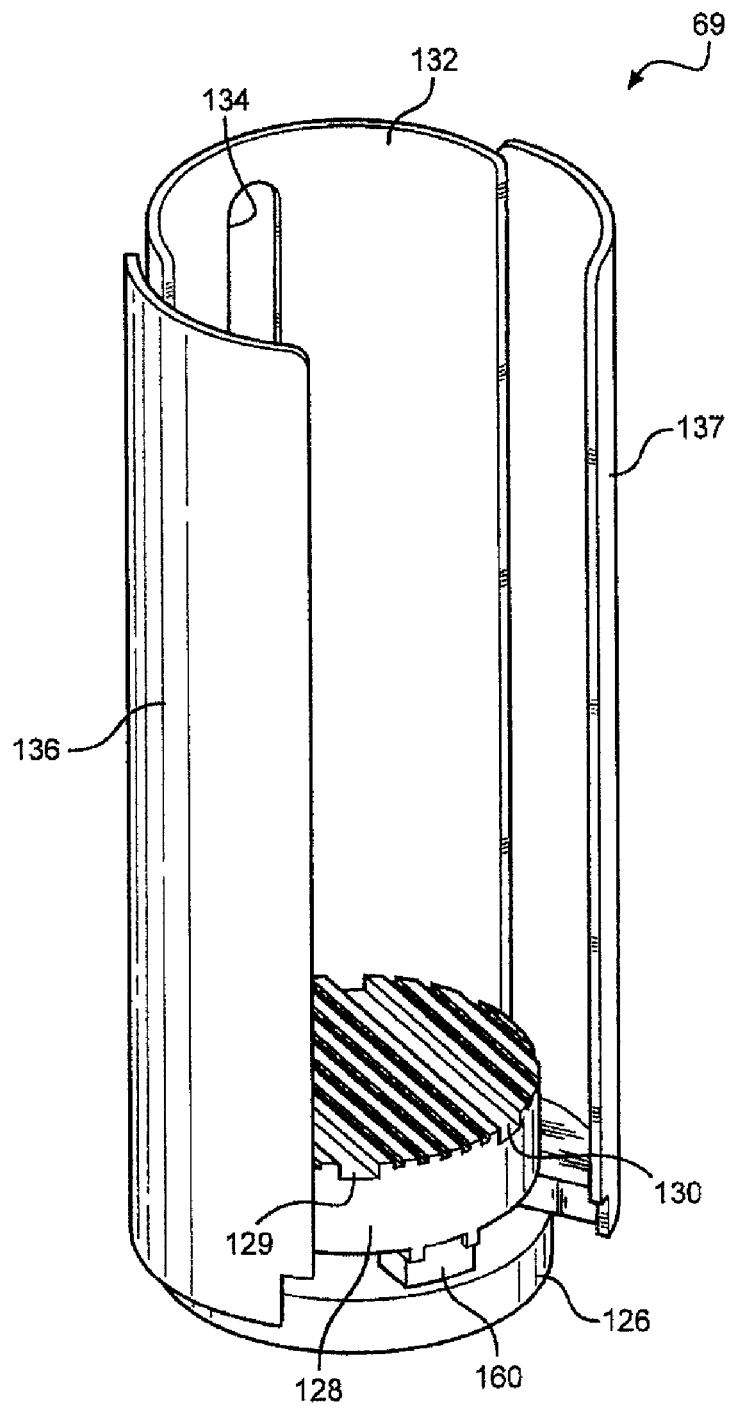
FIG. 4 is a perspective view of the transfer canister of FIG. 3 in an open condition.
Figure 5:
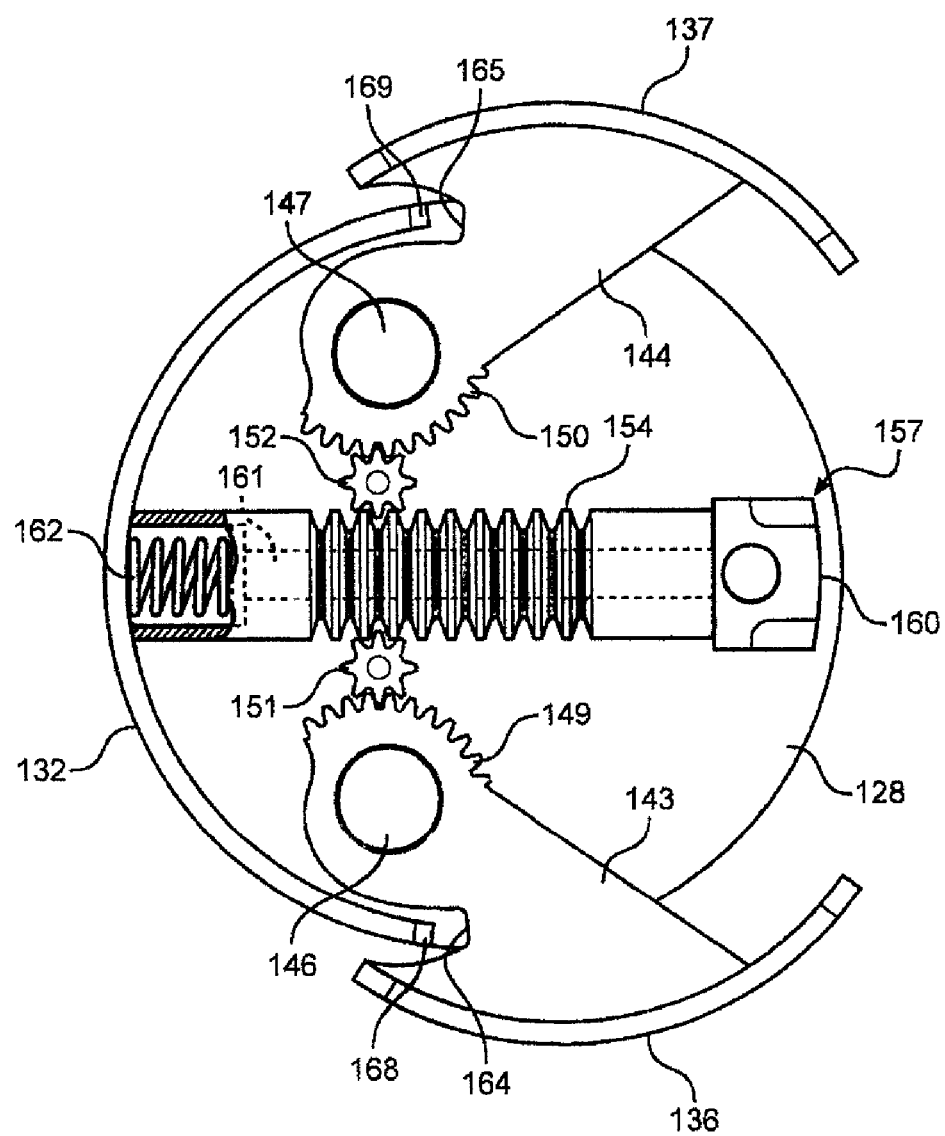
FIG. 5 is a bottom view of the transfer canister of FIG. 4.

FIGS. 3-5 illustrate one transfer canister embodiment for use with the invention. As shown, canister 69 includes a base 126 above which is mounted a pedestal 128. Pedestal 128 is formed with a pair of spaced, elongated grooves 129 and 130, although additional grooves (shown but not labeled) could be provided as well. Canister 69 includes a main upstanding body 132 which can take various configurations but which is shown to be arcuate in shape and to include an elongated airflow slot 134. Canister 69 also includes a pair of swingable door members 136 and 137. As illustrated from viewing FIGS. 3 and 4, door members 136 and 137 can be shifted between closed positions as shown in FIG. 3 to open positions as shown in FIG. 4. Although various mechanisms can be employed in connection with repositioning door members 136 and 137, FIG. 5 particularly illustrates one embodiment wherein door members 136 and 137 have associated support arms 143 and 144 which are pivotally mounted through pins 146 and 147 beneath pedestal 128. Support arms 143 and 144 are formed with respective gear portions 149 and 150 which mesh with respective pinion gears 151 and 152. Opposite support arms 143 and 144, pinion gears 151 and 152 are each meshed with a linear shifting rack gear 154. Rack gear 154 actually forms part of an overall actuator, generally indicated at 157, that includes a head 160 and an opposing shaft portion 161 which is shown to be biased by a spring 162.

With the above arrangement, the pushing of head 160 beneath pedestal 128 causes spring 162 to compress. Due to the interengagement between rack gear 154 and pinion gears 151 and 152, pinion gears 151 and 152 are caused to rotate with this linear movement of actuator 157. Correspondingly, the interengagement between gear portions 149 and 150 and pinion gears 151 and 152 cause a corresponding rotation of support arms 143 and 144 such that, upon the depression of actuator 157, door members 136 and 137 are caused to shift from the closed condition shown in FIG. 3 to the open condition shown in FIG. 4. To accommodate the movement of door members 136 and 137, support arms 143 and 144 are formed with crevices 164 and 165 which receive edge portions 168 and 169 of door members 136 and 137 as clearly shown in FIG. 5. Given the inclusion of spring 162, door members 136 and 137 are biased to the closed condition shown in FIG. 4. Although head 160 of actuator 157 could be arranged either flush with or recessed relative to door members 136 and 137, when door members 136 and 137 are closed, it is preferred to have head 160 exposed and slightly projecting outwardly as depicted in FIG. 3.

As discussed above with particular reference to FIG. 2, each transfer canister 69 is initially adapted to be filled with a stack of vertically exposed products 46. For stacking purposes, canister 69 has an open top as clearly illustrated in these figures. When products 46 are formed and stacked within canister 69, each canister assumes the closed condition shown in FIG. 3. After a series of canisters 69 are fully loaded, the canisters 69 are shifted to loading unit 42 which includes a pick-off mechanism, such as that shown in FIG. 6. As shown at the upper right portion of FIG. 6, a series of canisters 69 are conveyed with stacks of products 46. Along this line of conveyance there is shown another set of canisters 69 with door members 136 and 137 open. Finally, a further set of canisters 69 with the door members 136 and 137 closed are shown, but with the canisters 69 empty. In accordance with the invention, it is the function of pick-off device 175 to open door members 136 and 137 of each canister 69, grip the stack of products 46, remove the products 46 from the canister 69, re-orientate the stack of products 46 and horizontally load the stack of products 46 in a respective product receiving cavity 20. This overall operation is represented in FIG. 6 and discussed further below.

Figure 6:
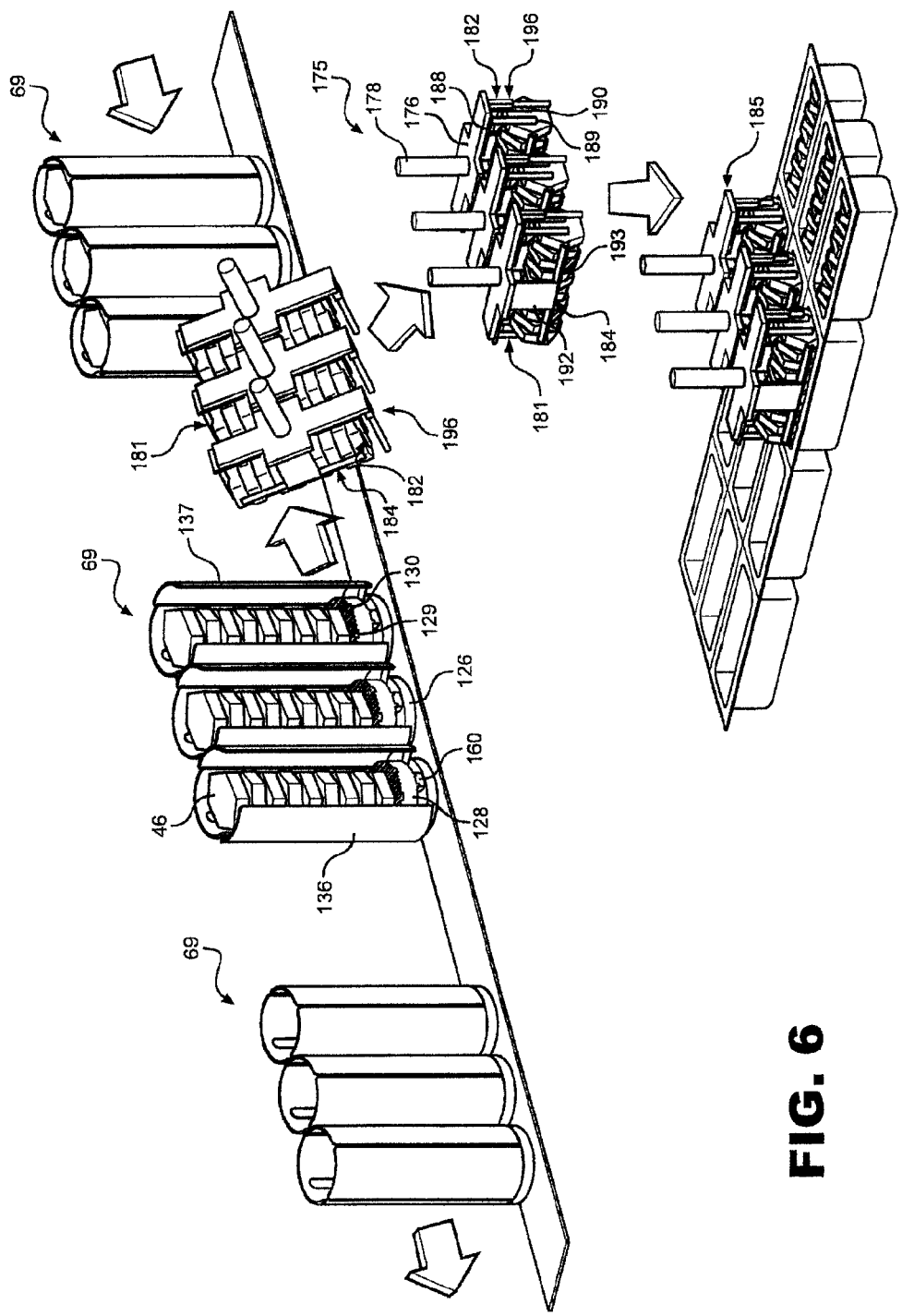
FIG. 6 is a perspective view of a pick-off system employed in combination with the transfer canister of the first embodiment of the invention.

As illustrated in FIG. 6, each pick-off device 175 generally includes a base 176 to which is attached a support rod 178. In the exemplary embodiment shown, three such pick-off devices 175 are operated concurrently and, commensurately, canisters 69 are conveyed in sets of three. Of course, this number and arrangement could readily vary without departing from the invention. In any case, each pick-off device 175 includes upper and lower grippers 181 and 182, as well as a pair of side grippers 184 and 185. More specifically, each of the upper and lower grippers 181 and 182 include a slidable plate 188 from which project a pair of pins 189 and 190. On the other hand, each of side grippers 184 and 185 includes a side plate 192 which is pivotally mounted to base 176 and an elongated side bar 193. Projecting from one end portion of base 176 is an auxiliary mechanism defining an activating member 196 which, as will be discussed more fully below, is adapted to engage actuator 157 when pick-off device 175 is directed at canister 69 in order to open door members 136 and 137.

More specifically, the series of pick-off devices 175 are adapted to be interconnected by a common robotic arm (not shown) which is associated with vertical loading unit 42 and manipulates each pick-off device 175 through support rod 178. Not shown for sake of clarity of the drawings are actuating mechanisms adapted to shift upper and lower grippers 181 and 182, as well as side grippers 184 and 185. In general, such actuating mechanisms are widely known in the art of robotics. In one form of the invention, these actuators simply constitute pneumatic linear actuators operating between base 176 and the various grippers 181, 182, 184 and 185. Electric solenoid units could be equally employed. With this arrangement, each of the grippers 181, 182, 184 and 185 can be selectively extended and retracted. More specifically, once each canister 69 reaches a pick-off location, an associated pick-off device 175 approaches the canister 69 with upper and lower grippers 181 and 182 being vertically spaced and side grippers 184 and 185 extending along substantially vertical axes. Upon directly approaching pick-off device 175, activating member 196 abuts head 160 of actuator 157 and causes shaft portion 161 to shift linearly, thereby compressing spring 162. Simultaneously, rack gear 154 is shifted linearly which causes rotation of pinion gears 151 and 152, as well as gear portions 149 and 150 of support arms 143 and 144. Shifting of support arms 143 and 144 causes door members 136 and 137 to open.

At this point, it should be understood that the central set of canisters 69 in FIG. 6 are shown open without their associated pick-off devices 175 directly adjacent the canister 69. This is only illustrated for the sake of clarity in order to indicate the stacking of products 46 within the canisters 69 with door members 136 and 137 open. Instead, in this embodiment, it is auxiliary mechanisms carried by the pick-off devices 175 which actually open the door members 136 and 137 as discussed above. In the alternative, each actuator 157 could simply engage fixed structure provided adjacent the canister conveyor (not labeled) when the set of canisters is at the predetermined unloading position thereby establishing another potential type of auxiliary door opening mechanism. In one alternative arrangement, the door members 136 and 137 are opened by having actuator head 160 exposed on an opposite side of canister 69 and engaged by an auxiliary mechanism (not shown) which is separate from the pick-off device 175. With this arrangement, pinion gears 151 and 152 are not needed. Instead, gear portions 149 and 150 directly interengage with rack gear 154. In any case, once the door members 136 and 137 are open, the pick-off devices 175 can shift within canisters 69 such that pins 189 and 190 of each lower gripper 182 extend within elongated grooves 129 and 130 of pedestal 128, thereby being positioned below the lowermost product 46. At the same time, upper grippers 181 are positioned above the uppermost product 46 within a respective canister 69. In the embodiment shown, canister 69 generally takes the form of cylinders, while products 46 are hexagonal in shape. This arrangement provides ample room for side grippers 184 and 185 to be positioned on the side portions of the stack of products 46 within the canister 69. Once each pick-off device 175 is located in this position, the upper and lower grippers 181 and 182 are shifted vertically relative to each other in order to squeeze down on and compress the stack of products 46, then the side grippers 184 and 185 are drawn against the stack of food products 46. At this time, pick-off devices 175 can remove the entire stacks of food products 46 from canisters 69, re-orient the stacks of food products 46 until they assume a substantially horizontal configuration as clearly shown in FIG. 6 and then load the respective stacks of food products 46 in respective product cavities 20, preferably through the simultaneous release of upper, lower and side grippers 181, 182, 184 and 185, such that the individual products 46 are horizontally arranged. This operation occurs at filling station 40 such that, once the operation is complete, packaged products 46 continue down the line of system 2 for the sealing and cutting operations in the manner discussed above.

Figure 7:
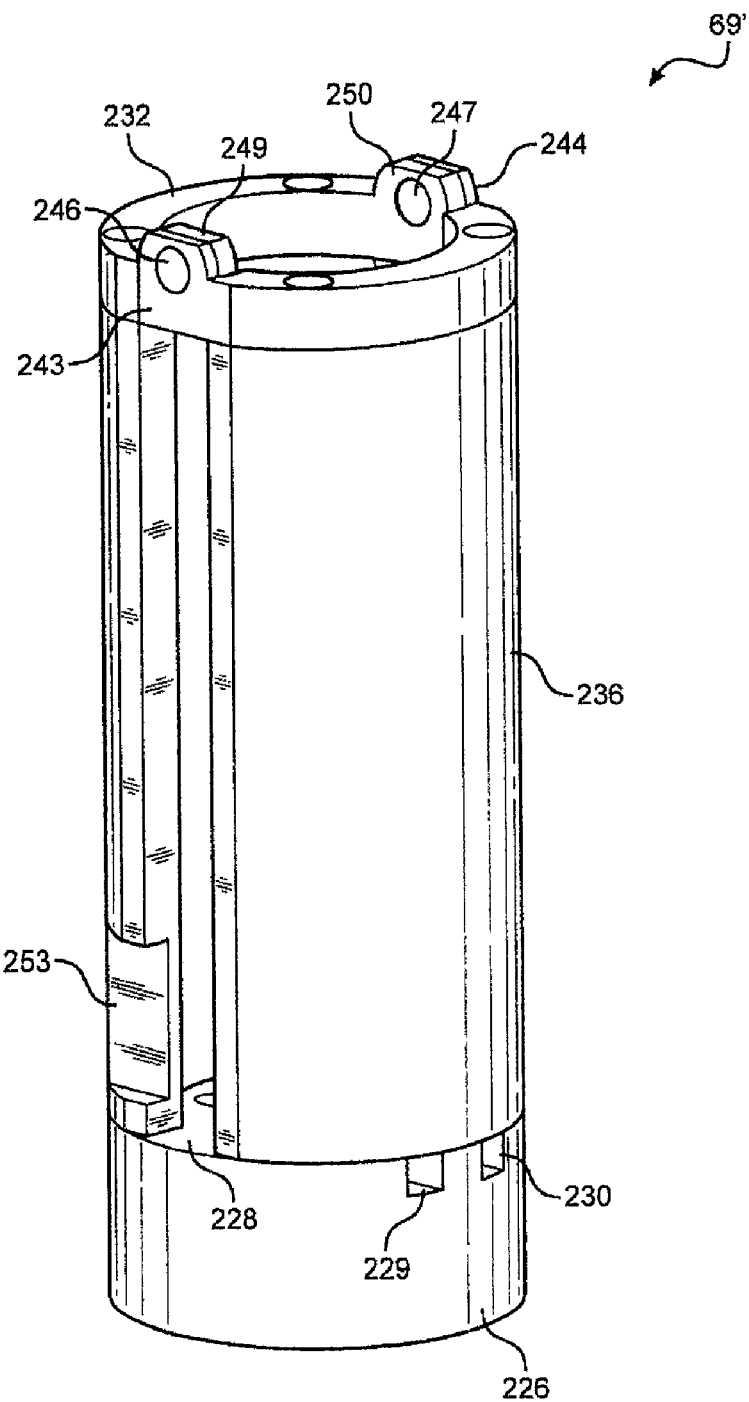
FIG. 7 is a perspective view of a transfer canister constructed in accordance with a second embodiment of the invention in a closed condition.
Figure 8:
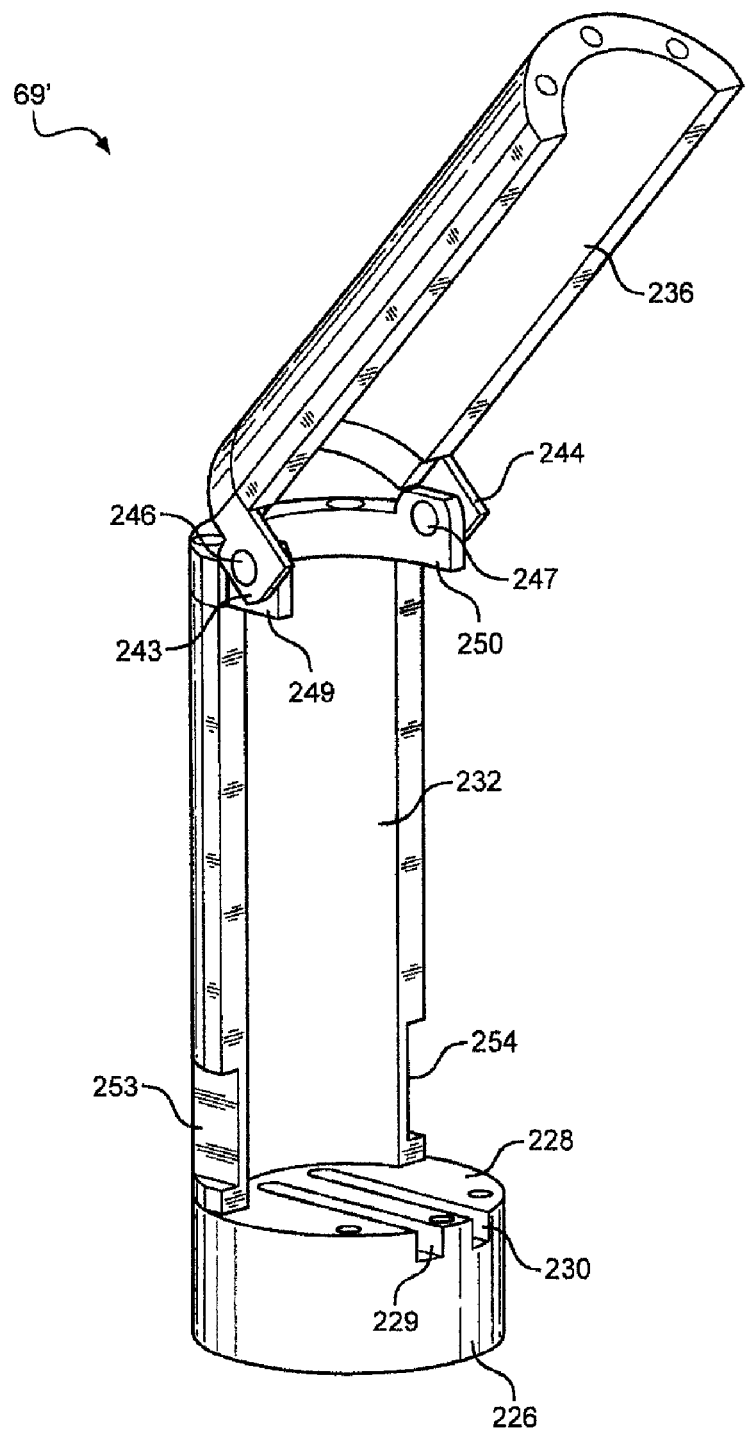
FIG. 8 is a perspective view of the transfer canister of FIG. 7 in an open condition.

As indicated above, the construction of the canisters can vary in accordance with the invention. Instead, it is only important that the various products 46 be able to be vertically loaded, preferably cut and immediately vertically loaded thereafter, in an effective and efficient manner corresponding to the manner in which refrigerator dough products have been loaded in composite paperboard containers in the past. Thereafter, the invention provides for the vertically loaded products to be removed in stacked form from the canisters, and re-orientated to a horizontal position for loading in the product receiving cavities. FIGS. 7 and 8 illustrate another potential embodiment for canisters 69' which can operate in accordance with the invention. In this embodiment, each canister 69' includes a base 226 which defines a pedestal 228 formed with a pair of spaced elongated grooves 229 and 230. Canister 69' also includes an upstanding arcuate main body 232 and a single door member 236 which can assume a closed position as shown in FIG. 7 and an open position shown in FIG. 8. For this purpose, door member 236 is provided with a pair of upper support arms 243 and 244 which are mounted through pins 246 and 247 to extension arms 249 and 250 of main body 232. With this arrangement, door member 236 can pivot about an axis defined by pins 246 and 247 relative to main body 232 from the closed position shown in FIG. 7 to the open position shown in FIG. 8.

In a manner directly analogous to the prior embodiment described, canisters 69' are adapted to be vertically loaded with stacks of food products 46 and then shifted to filling station 40 wherein a robotic device removes the entire stack of products 46 from each canister 69', re-orientates the stack of products 46 such that they assume a horizontal condition and then the stacks of products 46 are placed in respective product receiving cavities 20. Due to the different mounting of door 236, each main body portion 232 is preferably formed with a pair of lower grooved regions 253 and 254 which operate with additional structure for opening of door member 236 as will be discussed more fully below with reference to FIG. 9.

Figure 9:
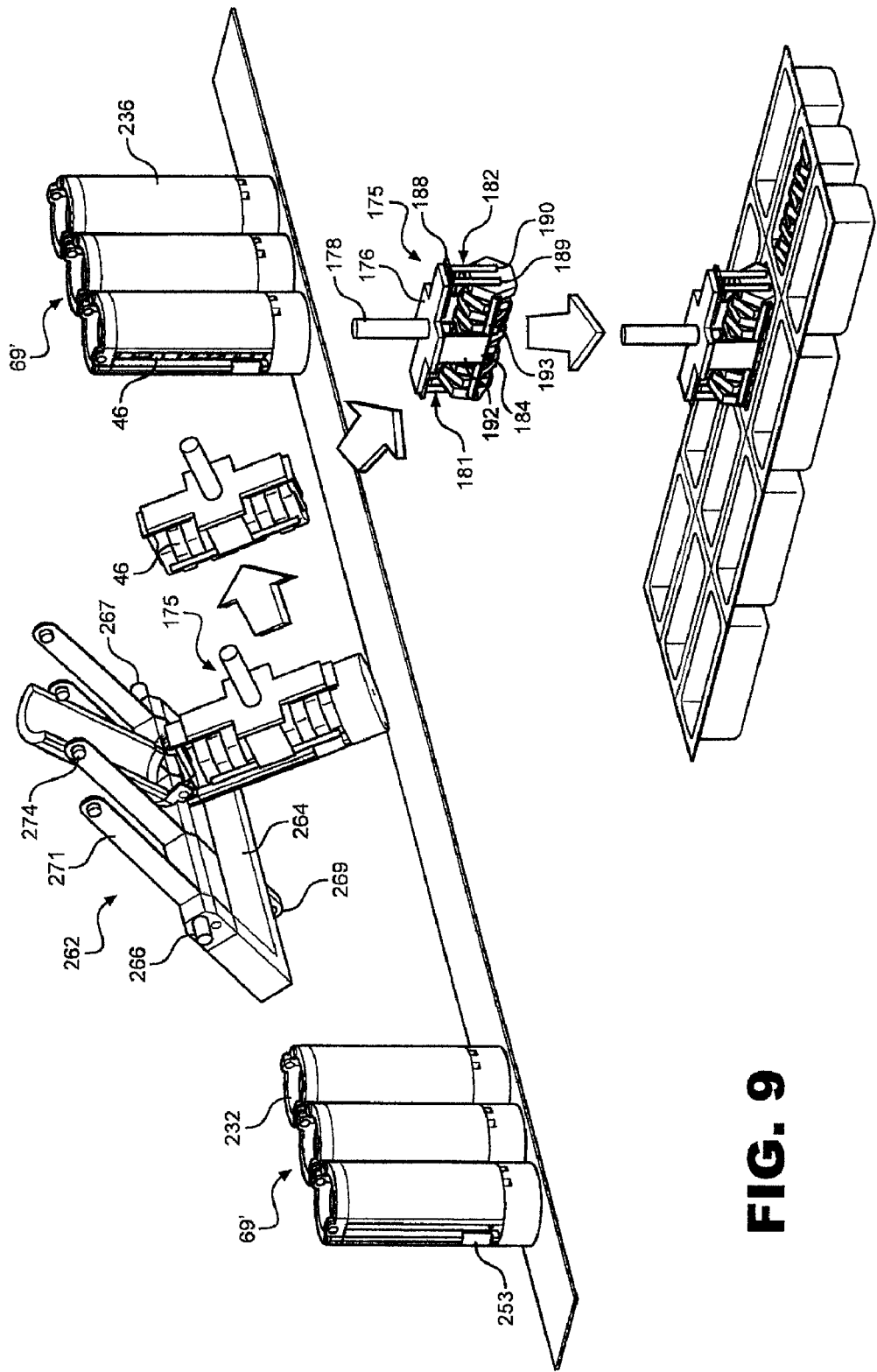
FIG. 9 is a perspective view of a pick-off system employed in combination with the transfer canister of the second embodiment of the invention.

As shown in FIG. 9, identical pick-off devices 175 are employed except that there does not exist any corresponding activating member 196. As the remainder of the structure is identical, like reference numerals to those discussed above with respect to pick-off device 175 have been utilized and the structure and function of these elements will not be duplicated here. More importantly, this embodiment of the invention includes the addition of an auxiliary mechanism in the form of a lifter unit indicated at 262. Lifter unit 262 includes a frame 264 from which laterally project pivot rods 266 and 267. Also extending from frame 264 is a motion lever 269. Extending away from frame 264 in a direction generally opposite to motion lever 269 are various spaced arms, one of which is indicated at 271. Each arm has fixedly secured and extending there through a respective pin 274.

As with the embodiment described above, canisters 69' are shown to be delivered to filling station 40 in sets of three, although the particular number can greatly vary and preferably corresponds to the number of laterally adjacent product receiving cavities 20 formed at thermoforming device 18. For use in connection with three adjacent arranged canisters 69', lifter unit 262 includes four correspondingly constructed and spaced arms 271 as clearly shown in FIG. 9. However, for sake of clarity, lifter mechanism 262 is only shown to be operating upon a single canister 69 in this figure, although it is to be understood that multiple canisters 69' are meant to be simultaneously opened for access to the stack of products 46 for loading purposes in a manner corresponding to the embodiment described above. In any case, when the set of canisters 69' reaches the loading station, lifter unit 262 is caused to rotate about the axis defined by pins 246 and 247 (note the fixed structure supporting pins 246 and 247 is not shown for clarity purposes) through the use of a linear actuator (also not shown) acting upon motion lever 262. This rotation of frame 264 causes a respective pair of pins 274 to enter grooved regions 253 and 254 of a respective canister 69' until the pins 274 abut the door member 236 of the canister 69'. Continued rotation of frame 264 causes the pins 274 to ride up door member 236, while simultaneously pivoting door member 236 relative to main body 232. Depending on the positioning of lifter unit 262 relative to the conveyed canister 69', lifter unit 262 preferably causes angling of main body 232 as illustrated or canisters 69' could be conveyed on an angled to the vertical. However, this angling is not a required feature of the invention. Once lifter unit 262 fully opens door member 236, the set of pick-off devices 175 directly engage and remove the stack of products 46 in the exact manner discussed above with respect to the first embodiment. The stack of products 46 are re-oriented and then loaded in a horizontal configuration within the respective product receiving cavities 20 in a manner directly corresponding to that discussed above.

Since products 46 are being removed from the canisters 69, 69' as a stack, it is important that each canister 69, 69' be properly aligned such that the stack of products 46 are appropriately exposed to the pick-off devices 175. FIGS. 10-13 illustrate an indexing and aligning mechanism designed to orientate the canisters 69, 69' prior to pick-off device 175. For use in connection with this aspect of the invention, each canister 69, 69' is supported by a carrier 280 which moves along a conveyor 282. Carrier 280 defines a plurality of canister receiving pockets 285 which, although not shown in these figures, have been loaded with a stack of products 46. Of course, it should be realized that other positioning and locating structure could be employed. In any case, each canister has associated therewith a base 288 which rests on conveyor 282. If desired to enhance the pick-off of the stack of products 46, the canister 69, 69' can be angled upon conveyor 282 within a respective pocket 285. In any case, base 288 has associated therewith a gear 290 having various spaced teeth 292 and a flat segment 294. As will be discussed more fully below, teeth 292 are adapted to interengage with teeth 296 of a rack gear 297 which is fixed to a block 300 along the conveying path. Adjacent rack 297 is an indexing mechanism 310 that includes a lever 312 which is secured to block 300 for pivotal movement about a fastener 315. Lever 312 is biased by a spring 325 such that an indexing finger 330 extending from lever 312 projects into a travel path of the canister, while being limited to pivot in this direction by means of stop 335.

Figure 10:
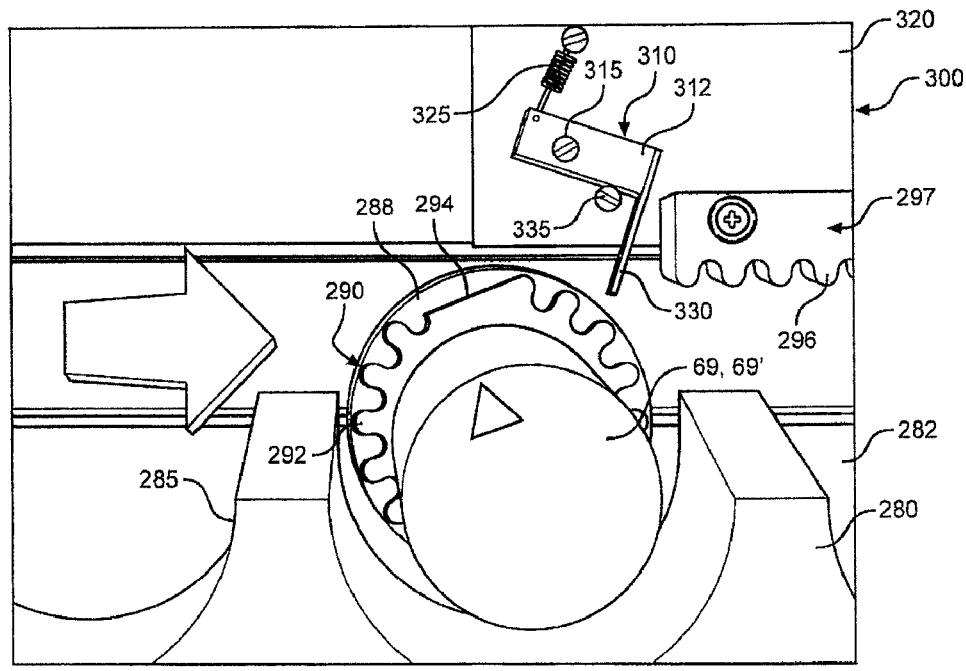
FIG. 10 is an upper perspective view illustrating a transfer canister approaching an indexing and aligning mechanism employed in connection with the pick-off system.
Figure 11:
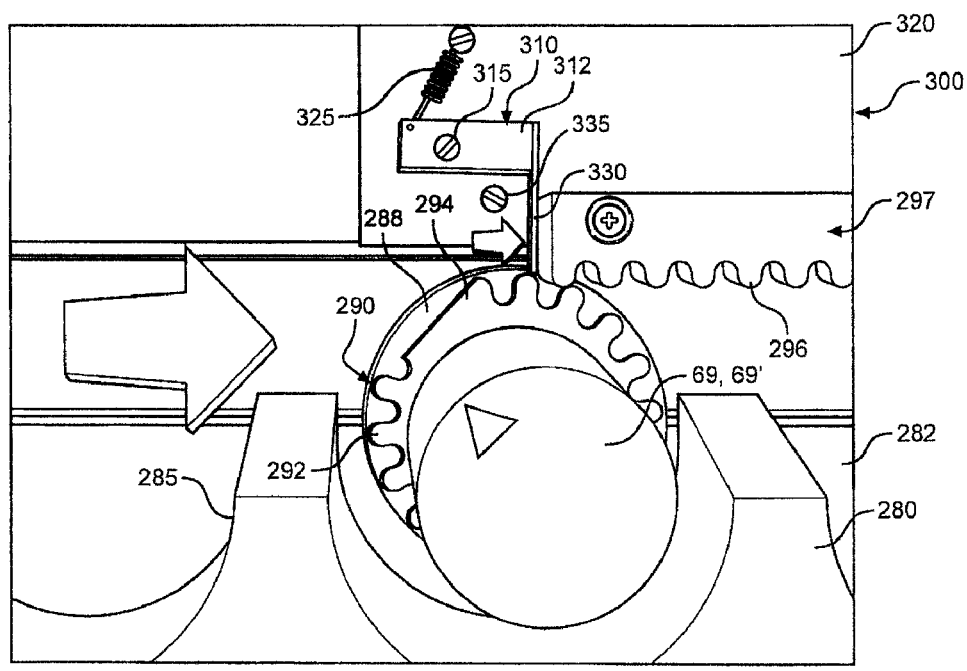
FIG. 11 shows the indexing and aligning mechanism in an initial transfer canister orientation phase.

As a given canister is approaching the indexing and aligning mechanism, the overall mechanism assumes the configuration shown in FIG. 10. Upon reaching indexing mechanism 310, a tooth 292 of gear 290 will abut finger 330 which will cause indexing lever 312 to pivot, while possibly rotating the canister, until indexing finger 330 clears a tooth 292 as shown in FIG. 11. Basically, indexing mechanism 310 is employed to ensure that gear 290 does not jamb with gear 297, but rather one of teeth 292 is properly oriented such that an adjacent tooth will directly mesh with rack 297 as shown in FIG. 11. Certainly, this indexing function can be performed in various ways, such as by employing an energy absorbing bumper (not shown) to cause the canister to rotate and properly engage the gearing.

Figure 12:
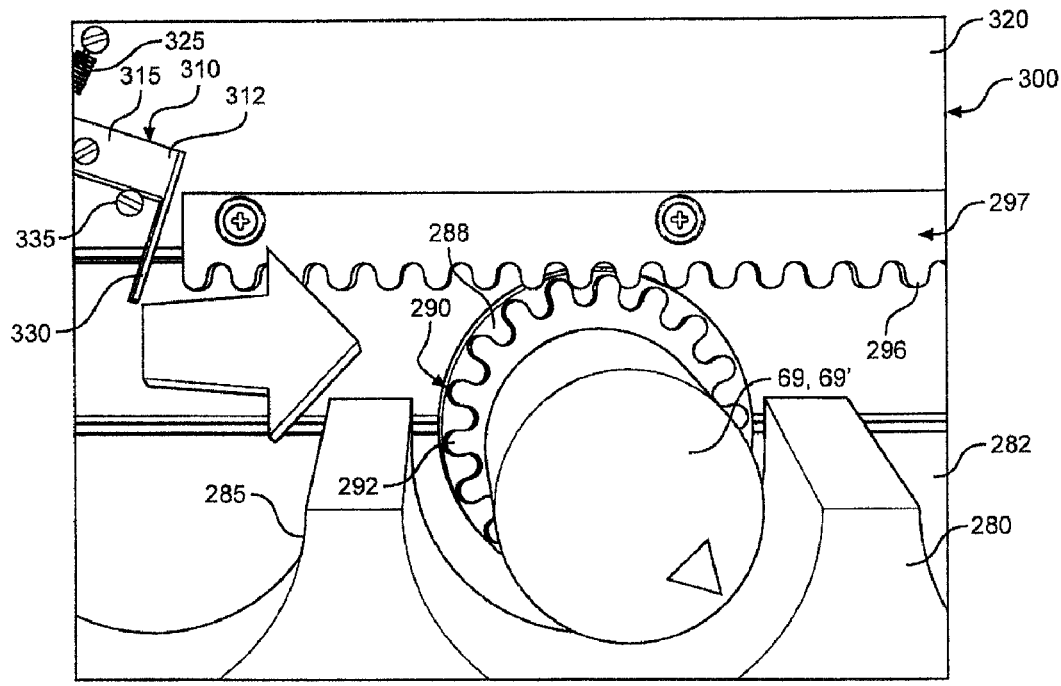
FIG. 12 shows the indexing and aligning mechanism in an intermediate transfer canister orientation phase.
Figure 13:
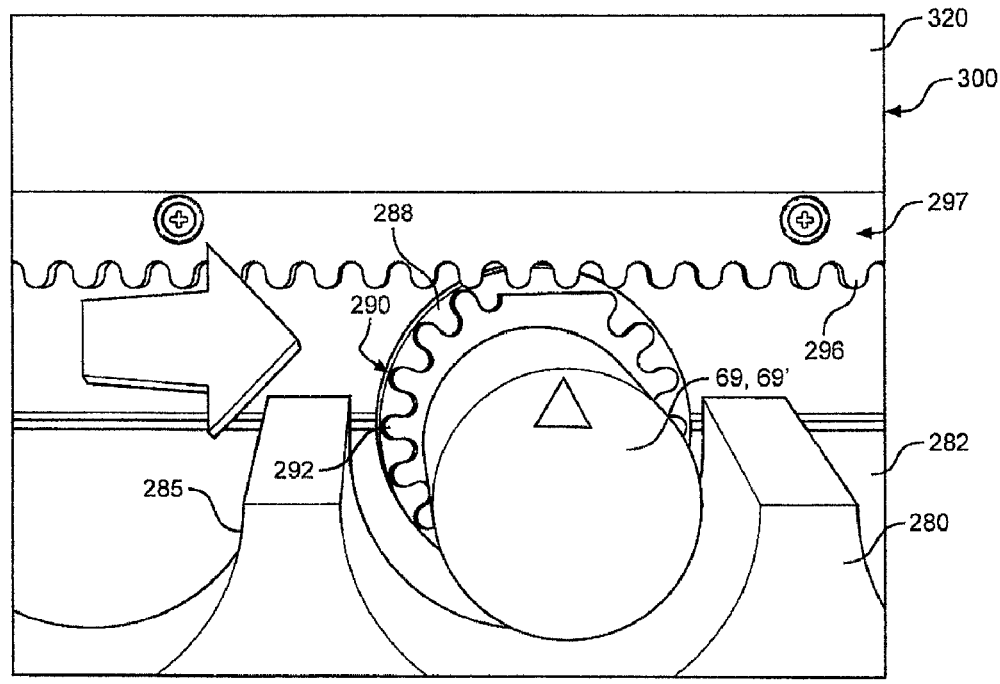
FIG. 13 shows the indexing and aligning mechanism in an final transfer canister orientation phase.

After gears 290 and 297 are interengaged, the continued movement of conveyor 282 will cause the canister to rotate as shown in FIG. 12 until flat segment 294 extends across a series of teeth 296 of rack 297 as shown in FIG. 13. It is at this point that the canister is properly orientated for opening of door members 136 and 137 or door member 236 of the embodiments described above.

Based on the above, it should be readily apparent that the invention provides for an efficient and effective way in which products can be initially, vertically stacked in transfer canisters during production and then re-oriented and transferred for horizontal loading as a stack in a final package. Again, the particular construction of the transfer canisters, the manner in which the canisters are opened and the way in which the stack of products are removed from the canisters, re-oriented, and loaded into final packages can greatly vary in accordance with the overall inventive concept. For instance, the transfer canisters could take the form of tubular bodies that receive inserts into which the products are stacked, with the inserts being removable from the tubular bodies for opening and exposure of the products for pick-off. In addition, it should be realized that the invention has applicability to a wide range of products, including the disclosed dough products. The invention can be employed with various types of packaging systems, but is considered to be extremely advantageous when used in combination with an HFFS packaging system. Furthermore, other indexing and aligning mechanisms could also be utilized to perform the desired orientation function for the canisters in accordance with the invention. In any case, although described with respect to exemplary embodiments of the invention, it should be readily understood that various changes and/or modifications can be made to the invention without departing from the spirit thereof. Instead, the invention is only intended to be limited by the scope of the following claims.

We claim:

1. A packaging system comprising:
    a transfer canister for supporting a plurality of individual products a vertical stack;
    a mechanism for opening the canister to expose the stack of products;
    a pick-off unit for removing the products, as a stack, from the canister, re-orienting the stack and depositing the stack of products horizontally into a container.

2. The packaging system according to claim 1, wherein the transfer canister includes a main body portion and at least one door which is movable between a closed position for loading of the transfer canister with the plurality of individual products and an open position for exposing the stack of products.

3. The packaging system according to claim 2, wherein the at least one door constitutes a pair of swinging doors.

4. The packaging system according to claim 3, further comprising:
    an actuator for opening the pair of swinging doors; and
    gearing interposed between the actuator and the pair of swinging doors.

5. The packaging system according to claim 2, further comprising: a lifting unit including a plurality of spaced arms for engaging opposing side portions of the at least one door to pivot the at least one door relative to the main body portion in order to expose the stack of products.

6. The packaging system according to claim 2, further comprising:
    a first supply unit providing a first plastic film;
    a thermoforming device, said thermoforming device being adapted to receive the first plastic film and create thermoformed pouches defining multiple product receiving cavities, with each product receiving cavity being adapted to receive a stack of products from the pick-off device:
    a second supply unit providing a second plastic film across multiple ones of the product receiving cavities:
    a sealing unit for sealing the second plastic film to the first plastic film of the pouches about the multiple ones of the product receiving cavities; and
    a cutter unit, said cutter unit being adapted to sever the first and second plastic films in order to establish individual thermoformed pouches each containing a stack of the products.

7. The packaging system according to claim 1, wherein the transfer canister includes a platform for directly supporting the stack of products, said platform being formed with at least one elongated groove, and wherein said pick-off unit includes a gripper member adapted to extend within the at least one elongated groove in removing the products from the transfer canister.

8. The packing system according to claim 1, further comprising:
    an indexing and aligning mechanism for orientating the transfer canister prior to the pick-off unit.

9. The packing system according to claim 8, wherein the indexing and aligning mechanism includes a gear carried by the transfer canister which interengages with a fixed rack gear to rotate and orientate the transfer canister for the pick-off unit.

10. The packing system according to claim 9, wherein the gear includes a flat segment which is void of teeth, said transfer canister being properly orientated when the flat segment is directly adjacent the rack gear.

11. The packing system according to claim 9, wherein the indexing and aligning mechanism further includes a pivotally mounted indexing finger adapted to align the gear for interengagement with the rack gear.

* * * * *